United States Patent [19]

Arai et al.

[11] Patent Number: 5,318,839
[45] Date of Patent: Jun. 7, 1994

[54] LAMINATE WITH A STYRENIC POLYMER LAYER

[75] Inventors: Yosuke Arai; Yuichi Oki; Eiji Maemura, all of Himeji; Keisuke Funaki, Ichihara, all of Japan

[73] Assignee: Idemitsu Petrochemical Co., Ltd., Tokyo, Japan

[21] Appl. No.: 831,840

[22] Filed: Feb. 6, 1992

[30] Foreign Application Priority Data

Feb. 7, 1991 [JP] Japan .................... 3-036565

[51] Int. Cl.⁵ .................. B32B 27/08; C08L 25/00
[52] U.S. Cl. ........................ 428/329; 428/332; 428/462; 428/512; 428/516; 428/517; 428/910; 427/391
[58] Field of Search ............... 428/516, 910, 517, 329, 428/332, 462, 512; 427/391

[56] References Cited

U.S. PATENT DOCUMENTS 5,089,353  2/1992  Negi et al. .

FOREIGN PATENT DOCUMENTS 0291098  11/1988  European Pat. Off. .
0314146   5/1989  European Pat. Off. .
2843987   1/1980  Fed. Rep. of Germany .
3105337  12/1981  Fed. Rep. of Germany .

*Primary Examiner*—P. C. Sluby
*Attorney, Agent, or Firm*—Oblon, Spivak, McClelland, Maier & Neustadt

[57] ABSTRACT

There is disclosed a laminate comprising (a) a layer of a styrenic polymer having a higher degree of syndiotactic configuration and a crystallinity of at least 25%, preferably 35%, (b) a layer of paper and optionally (c) an adhesive layer and (d) a barrier layer. The above laminate is excellent in heat resistance, hydrolytic resistance, tearability, dead foldability and gloss and can find a wide range of effective application.

16 Claims, 2 Drawing Sheets

5,318,839

LAMINATE WITH A STYRENIC POLYMER LAYER

BACKGROUND OF THE INVENTION

1. Field of the Invention

The present invention relates to a laminate. More particularly, it pertains to a laminate excellent in heat resistance, moisture resistance, hydrolytic resistance, tearability, dead foldability and gloss.

2. Description of the Related Arts

There has heretofore been used a laminate comprising a paper and resin as packaging material, release paper for industrial use, ovenable tray, baking carton and the like. Specific examples of known laminates include a laminate of paper/polyethylene aimed at moisture resistance and heat sealing property, that of paper/polypropylene aimed at oil and chemical resistances and flexibility, that of paper/vinylidene chloride aimed at steam and gas barrier properties, that of paper/cellophane aimed at dead foldability, tearability and gloss, and those of paper/polymethylpentene and paper/polyester each aimed at heat resistance and the like.

In recent years, however, new demands have become greater in addition to the above-mentioned last two items of aims. More specifically, the paper/cellophane laminate is required to solve such problems as the use of a large amount of harmful chemicals during the production of cellophane films, complicated production process thereof by the remarkable variation in physical properties due to the moisture of the film to be obtained and expensive cost of the laminate. The paper/polymethylpentene laminate and paper/polyester laminate each aimed at heat resistance are incapable of enduring the cooking with the latest ovens; the paper/polyester laminate is liable to be hydrolyzed; and the paper/polymer laminate excluding paper/cellophane laminate involves the problem of insufficient dead foldability, that is, the failure to leave dead fold when folded. The solution of the foregoing problems is eagerly desired.

In view of the above-described situations, intensive research and investigation were made by the present inventors on the lamination of a paper and a variety of resins for the purpose of developing a laminate excellent not only in heat resistance, moisture resistance, water resistance and gloss but also in tearability and dead foldability. As a result, it has been discovered that the laminate of a styrenic polymer having a specific configuration and paper combined with each other meets all of the aforestated purposes. The present invention has been accomplished on the basis of the above-mentioned finding and information.

SUMMARY OF THE INVENTION

It is an object of the present invention to provide a laminate of a specific resin and paper having excellent resistances against heat, moisture and water, and excellent gloss, tearability and dead foldability.

It is another object of the present invention to provide a laminate of a specific resin, paper and at least one layer selected from an adhesive layer and barrier layer.

The present invention provides a laminate which comprises (a) a layer of a styrenic polymer having a high degree of syndiotactic configuration and a crystallinity of at least 25% or a composition containing said styrenic polymer, said layer having a thickness of 5 to 50 μm and (b) a layer of paper as a primary ingredient.

Figure 1:
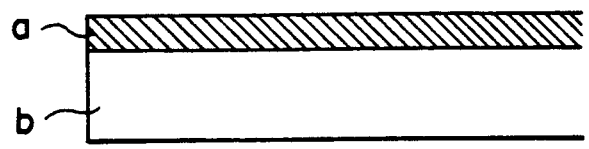
FIG. 1 is a schematic sectional view showing a constitutional example of the laminate of the present invention.

In the above figures, symbols a, b, c and d designate a layer comprising a styrenic polymer having a high degree of syndiotactic configuration or a composition containing the same; a layer comprising a paper as the primary component; an adhesive layer; and a barrier layer, respectively.

DESCRIPTION OF PREFERRED EMBODIMENTS

The laminate according to the present invention comprises as the indispensable constituents (a) a layer of a styrenic polymer having a high degree of syndiotactic configuration and a crystallinity of at least 25% or a composition containing the same, which layer having a thickness of 5 to 50 μm and (b) a layer of paper as a primary ingredient. Here, the layer (a) is composed of a styrenic polymer having a high degree of syndiotactic configuration and a crystallinity of usually 35% or higher. By the aforesaid high degree of syndiotactic configuration is meant that its stereochemical structure is of a high degree of syndiotactic configuration, i.e. the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pented in which five structural units are connected to each other. "The styrenic polymers having such a high degree of syndiotactic configuration" as mentioned in the present invention usually means polystyrene, poly(alkylstyrene), poly(halogenated styrene), poly(alkoxystyrene), poly(vinyl benzoate), hydrogenated polymers thereof, the mixtures thereof, and copolymers containing the above polymers as main components, having such a syndiotacticity that the proportion of racemic diad is at least 75%, preferably at least 85%, or the proportion of racemic pented is at least 30%, preferably at least 50%. The poly(alkylstyrene) includes poly(methylstyrene), poly(ethylstyrene), poly(propylstyrene), poly(butylstyrene), poly(phenylstyrene), poly(vinylnaphthalene), poly(vinylstyrene), and poly(acenaphthylene). Poly(halogenated styrene) includes poly(chlororstyrene), poly(bromostyrene), and poly(fluorostyrene). Poly(alkoxystyrene) includes poly(methoxystyrene) and poly(ethoxystyrene).

The most desirable styrenic polymers are polystyrene, poly(p-methylstyrene), poly(m-methylstyrene), poly(p-tertbutylstyrene), poly(p-chlorostyrene), poly(m-chlorostyrene), poly(p-fluorostyrene), and the copolymer of styrene and p-methylstyrene (Japanese Patent Application Laid-Open No. 187708/1987).

Moreover, the comonomers that are usable in the aforementioned styrenic copolymers are exemplified by, in addition to the above-mentioned monomers usable in the styrenic polymers, olefin monomer such as ethylene, propylene, butene, hexane and octene; diolefin monomer such as butadiene and isoprene; cyclic diolefin monomer; and polar vinyl monomer such as methyl methacrylate, glycidyl methacrylate, hydroxyethyl methacrylate, maleic acid, maleate, maleic anhydride, fumaric acid, fumarate, maleimide, acrylamide, vinyl silane and acrylonitrile.

The molecular weight of the styrenic polymer to be used in the present invention is not specifically limited, but is desirably 10,000 to 3,000,000, particularly desirably 50,000 to 1,500,000 in terms of weight-average molecular weight. In the case where the weight-average molecular weight is less than 10,000, sufficient orientation is impossible to carry out. The molecular-weight distribution, that is, the broading of molecular weight of the styrenic polymer is not specifically limited as well, but may be in a wide range. However, the ratio of weight-average molecular weight to number-average molecular weight is preferably 1.5 to 8.0. Meanwhile, the styrenic polymer with syndiotactic configuration is much superior in heat resistance to the conventional styrenic polymer with atactic configuration.

As the layer (a) of the laminate according to the present invention, the styrenic polymer having such a high degree of syndiotactic configuration may be used as such, but a composition of said styrenic polymer compound with various additives may be also used. Examples of such additives include inorganic fine particle, antioxidant, antistatic agent, flame retardant, a resin of different type, etc., each of which may be pertinently compounded within a loading which does not impair the objective effect of the present invention.

Examples of the inorganic fine particle as mentioned above include oxides, hydroxides, sulfide, nitride, halide, carbonate, sulfate, acetate, phosphate, phosphite, organocarboxylate, silicate, titanate, borate, each of an element belonging to any of Groups IA, IIA, IVA, VIA, VIIA, VIII, IB, IIB, IIIB and IVB, hydrated compound thereof, double compound containing the above as primary component, mineral grain of natural origin, etc.

They are more specifically exemplified by compounds of Group IA element such as lithium fluoride and borax (sodium borate hydrate); compounds of Group IIA element such as magnesium carbonate, magnesium phosphate, magnesium oxide (magnesia), magnesium chloride, magnesium acetate, magnesium fluoride, magnesium titanate, magnesium silicate, magnesium silicate hydrate (talc), calucium carbonate, calcium phosphate, calcium phosphite, calcium sulfate (gypsum), calcium acetate, calcium terephthalate, calcium hydroxide, calcium silicate, calcium fluoride, calcium titanate, strontium titanate, barium carbonate, barium phosphate, barium sulfate and barium phosphite; compounds of Group IVA element such as titanium dioxide (titania), titanium monoxide, titanium nitride, zirconium dioxide (zirconia) and zirconium monoxide; compounds of Group VIA element such as molybdenum dioxide, molybdenum trioxide and molybdenum sulfide; compounds of Group VIIA element such as manganese chloride and manganese acetate; compounds of Group VIII element such as cobalt chloride and cobalt acetate; compounds of Group IB element such as cuprous iodide; compounds of Group IIB element such as zinc oxide and zinc acetate; compounds of Group IIIB element such as aluminum oxide (alumina), aluminum hydroxide, aluminum fluoride and aluminosilicate (aluminum silicate, kaolin, kaolinite); compounds of Group IVB element such as silicon oxide (silica, silica gel), plumbago, carbon, graphite and glass; mineral grain of natural origin such as carnallite, caenite, mica, sericite and pyrolusite.

The average particle diameter of the inorganic fine particle to be used is not specifically limited but is desirably 0.01 to 3 $\mu$m, more desirably 0.01 to 1 $\mu\mu$m. The content thereof in the molding is 0.001 to 1% by weight, preferably 0.005 to 1% by weight. The inorganic fine particle is incorporated in the finished molding. The method of incorporating is not limited but is exemplified by a method in which the fine particle is added to or deposited in the polymerization system in an arbitrary step and a method in which the fine particle is added in the arbitrary step of melt extrusion.

As the resin of different type which may be added to the foregoing styrenic polymer, a variety of resins are available and exemplified by styrenic polymer having atactic or isotactic configuration, polyphenylene ether, etc. The above resins are easily compatible with the aforestated styrenic polymer having syndiotactic configuration, are effective in controlling the crystallization at the time of producing a preform for orientation, improve the stretchability thereafter, facilitate the control of orientation conditions and enable the production of a film excellent in dynamical properties. In the case where a styrenic polymer having atactic and/or isotactic configuration is incorporated, the styrenic polymer having a chemical constitution same as that of a styrenic polymer having syndiotactic configuration is preferably used in an amount of 70 to 1% by weight, preferably 50 to 2% by weight based on the total weight of both the resins. The content of the compatible resin component exceeding 70% by weight is unfavorable since it impairs the heat resistance which is one of the advantages of the symdiotactic styrenic polymer. Examples of incompatible resins which may be added to the styrenic polymer to be used in the present invention include polyolefins such as polyethylene, polypropylene, polybutene and polypentene; polyesters such as polyethylene terephthalate, polybutylene terephthalate and polyethylene naphthalate; polyamides such as nylon 6 and nylon 6,6; polythioethers such as polyphenylene sulfide; polycarbonate; polyarylate; polysulfone; polyether ether ketone; polyether sulfone; polyimide; halogenated vinylic polymer such as Teflon; acrylic polymer such as methyl methacrylate; polyvinyl alcohol, that is, all the resins other than the above-described compatible resins, and further, crosslinked resin containing the aforestated compatible resins. In the case where the foregoing incompatible resin is incorporated in the styrenic polymer with syndiotactic configuration according to the present invention in a small amount, it can be dispersed in the syndiotactic styrenic polymer just like islands in the sea because of its incompatibility. The above-mentioned result is useful in providing the orientated resin with favorable gloss or in improvind surface slipperiness of the resin. The content of the indompatible resin component is desirably 50 to 2% by weight for the purpose of glossiness and 0.001 to 5% by weight for the purpose of controlling the surface property. For the resin product to be used at a higher temperature, the incompatible resin which is relatively heat resistant is preferably employed.

The styrenic polymer having syndiotactic configuration which constitute the aforesaid layer (a) should have a crystallinity of 25% or higher, desirably 30% or higher, more desirably 35% or higher. A crystallinity less than 25% fails to produce an objective laminate having sufficient heat resistance. In addition, the suitable thickness of the layer (a) thus obtained is in the range of 5 to 50 $\mu$m, preferably 7 to 40 $\mu$m. A thickness of the layer (a) less than 5 $\mu$m fails to produce an objective laminate which can exhibit the effect of employing the above-mentioned styrenic polymer, whereas a thickness thereof more than 50 $\mu$m results in the loss of the characteristics of paper as well as the hand and drape thereof.

As the layer (b) which constitutes the laminate of the present invention, there is available a generally used natural paper. The thickness of the paper of the laminate may be optionally determined according to the purpose of use.

Figure 2:
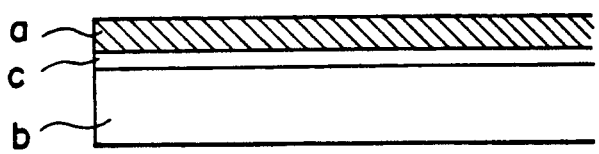
FIG. 2 is; a schematic sectional view showing another constitutional example of the laminate of the present invention.
Figure 3:
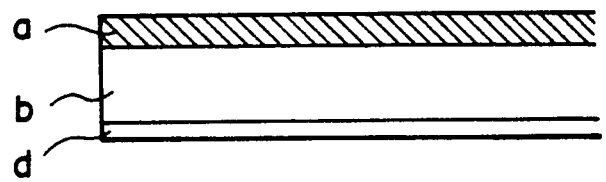
FIG. 3 is a schematic sectional view showing another constitutional example of the laminate of the present invention.
Figure 4:
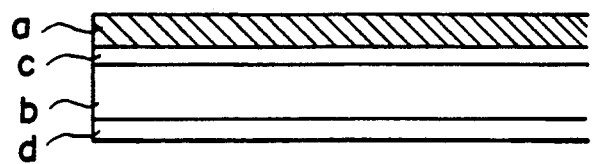
FIG. 4 is a schematic sectional view showing another constitutional example of the laminate of the present invention.
Figure 5:
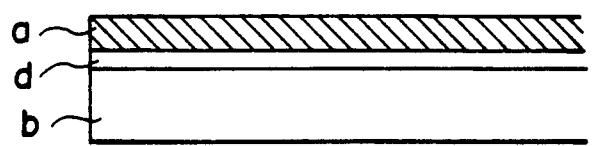
FIG. 5 is a schematic sectional view showing another constitutional example of the laminate of the present invention.
Figure 6:
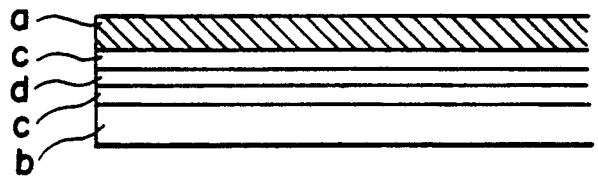
FIG. 6 is a schematic sectional view showing another constitutional example of the laminate of the present invention.

The constitution of the laminate according to the present invention may include, in addition to a laminate 1 comprising the layer (a) and layer (b) as shown in FIG. 1, a laminate comprising the layer (a), layer (b) and an adhesive layer (c) interposed therebetween as shown in FIG. 2; a laminate comprising layer (a) and layer (b) on the other side of which is installed a barrier layer (d) as shown in FIG. 3; a laminate comprising layer (a), layer (b) and a barrier layer (d) interposed therebetween as shown in FIG. 5; and laminates as shown in FIGS. 4 and 6 containing both adhesive layer(s) and barrier layer(s) in addition to the layers (a) and (b). As the above-mentioned adhesive layer (c), there are usable a variety of adhesives and adhesive resins that are used for adhering the material of the similar types. Examples of usable barrier layer (d) include aluminum foil, metallic vapor deposition film, inorganic-oxide vapor deposition film, etc. The adhesive layer (c) and barrier layer (d) may be incorporated as required according to the purpose of use of the laminate.

In what follows, the production procedure of the laminate according to the present invention will be described. The method of laminating the layers (a) and (b) is basically divided into two methods including a method wherein the foregoing styrenic polymer constituting the layer (a) is molten, then extruded through a T-die and directly laminated with a paper, and a method wherein a film consisting of the styrenic polymer of the layer (a) is formed followed by laminating by means of wet lamination, dry lamination or hot-melt lamination or by the use of an adhesive.

In the aforesaid first method wherein the styrenic polymer is molten followed by direct lamination with a paper, the styrenic polymer having a high degree of syndiotactic configuration as described hereinbefore or a composition containing the same is molten at a temperation ranging from the melting point thereof to a temperature 50° C. higher than the degradation temperature thereof and extruded through T-die, and the bandlike melt thus extruded is directly adhered to a paper which is fed separately. In the aforesaid procedure, it is possible to prevent melt fracture and thereby improved adhesiveness and gloss by adjusting the shear stress at the time of adhesion to $5 \times 10^6$ dyne/cm$^2$ or less. Moreover as described hereinbefore, an adhesive or an adhesive resin may be put between the styrenic polymer and the paper to enhance the adhesiveness of the layers (a) and (b). As the method for interposing the adhesive layer, there are available a method in which the styrenic polymer and an adhesive or the like are coextruded, a method in which a paper and adhesive are laminated in advance and a method in which the three layers are simultaneously laminated.

In the foregoing second method wherein a film consisting of the styrenic polymer of the layer (a) is previously formed, either of a non-oriented film and an oriented film may be used. The non-oriented film is obtained by, as mentioned above, melting the styrenic polymer having a high degree of syndiotactic configuration or a composition containing the same at a temperature ranging from the melting point thereof to a temperature 50° C. higher than the degradation temperature thereof and extruding the melt thus obtained through a T-die. In the aforesaid procedure, the non-oriented film has preferably a low crystallinity, and the temperature of a cooling roll is preferably adjusted to the temperature 10° C. higher than the glass transition temperature of the styrenic polymer (Tg) at the highest, i.e. Tg +10° C., max.

The process for producing the oriented film is not specifically limited but is exemplified by a method described hereunder: Firstly, the foregoing styrenic polymer or the composition containing the same as the raw material is usually extrusion molded into the preform for orientation in the form of film, sheet or tube; in the above molding, the heat-molten raw material is generally formed into a prescribed form by the use of an extruding machine, but the raw material in softened state instead of being heat molten may be formed. The usable extruding machines include a uniaxial extruding machine and biaxial extruding machine, each with or without a vent. The use of an appropriate mesh in the extruding machine can eliminate impurities and foreign matters. The shapes of the usable mesh include plate, cylinder, leaf disc and the like, which may be suitably selected. The extrusion condition is not specifically limited but may be suitably selected according to the various situations. The preferable extrusion conditions include a extrusion temperature ranging from the melting point of the raw material to the temperature 50° C. higher than the degradation temperature of the same; a shear stress of $5 \times 10^6$ dyne/cm$^2$ or less; and a die of T-die, annular die or the like.

After the aforestated extrusion molding, the preform for orientation thus obtained is cooled for solidification by the use of a refrigerant such as gas, liquid, metallic roll or the like. In the case of a metallic roll being used, the application of an air knife, air chamber, touch roll or electrostatic charging is effective in preventing unevenness of thickness and waviness of the film.

The cooling solidification is effected usually at a temperature ranging from 0° C. to the temperature 30° C. higher than the glass transition point of the preform for orientation, preferably ranging from the temperature 70° C. lower than the above glass transition point to the above glass transition point. The cooling rate is suitably selected in the range of 200° to 3° C. per second.

In the present invention, the cooled and solidified preform is biaxially oriented to form films. The biaxial orientation may be carried out simultaneously in the machine and transverse directions or successively in the optional order, and may be effected in single stage or multi-stage. The draw ratio in terms of area ratio is 2 or more, preferably 3 or more. The draw ratio in the above range can produce the film having favorable physical properties such as a crystallinity of 25% or higher.

There are available a variety of orientation methods, which include the method by a tenter, roll-orientation method, bubbling method by the use of pneumatic pressure, rolling method, etc., each of which may be suitably selected or combined with another. The orientation temperature may be usually set in the range of the glass transition point of the preform to the melting point thereof. The orientation rate is generally $1 \times 10$ to $1 \times 10^5$% per minute, preferably $1 \times 10^3$ to $1 \times 10^5$% per minute. The oriented film obtained under the foregoing conditions is preferably subjected to heat setting when dimensional stability at elevated temperature, heat resistance or balanced strength inside the film is required according to the purpose of use. The heat setting may be performed by the conventional method, for example, by a method wherein the oriented film is maintained for 0.5 to 600 seconds at a temperature ranging from the glass transition point of the film to the melting point thereof, preferably ranging from the temperature 140° C. lower than the melting point thereof to the temperature slightly lower than the melting point thereof under the condition of tension, non-tension or limited contraction. In addition, the heat setting can be carried out twice or more under different conditions within the above-described ranges, and may be effected in an atmosphere of an inert gas such as argon gas and nitrogen gas.

The non-oriented or oriented film thus obtained is laminated with a paper. The usable lamination methods include, as described above, wet lamination, dry lamination and hot-melt lamination. For the purpose of improving adhesiveness, the film thus obtained may be subjected in advance to corona discharge treatment, plasma treatment, flame treatment, ultraviolet ray treatment, ozone treatment, chemical treatment other than the above or the like.

The laminate thus obtained is preferably heat treated for the purpose of improving the heat resistance and dimentional stability. By the heat treatment at 150° to 260° C. for 3 to 120 sec. after the lamination of the film and paper, there is obtainable a laminate excellent in heat resistance comprising the above-mentioned styrenic polymer having a crystallinity of 35% or higher. In the case, however, where an oriented film is Used and heat treated at the time of production thereof to attain a crystallinity of 35% or higher, the heat treatment after lamination may be omitted.

The laminate according to the present invention is excellent in heat resistance withstanding the cooking with an oven, hydrolytic resistance, tearability, dead foldability and gloss, and therefore, can find a wide range of effective use in the field of packaging materials, release paper for industrial use, ovenable tray, baking carton and so forth.

In the following, the present invention will be described in more detail with reference to the non-limitative Examples and Comparative Examples.

PRODUCTION EXAMPLE (PREPARATION OF SYNDIOTACTIC POLYSTYRENE)

(1) Preparation of contact product of aluminum compound and water.

In a 500 ml glass vessel which had been purged with argon were placed 200 ml of toluene, 23.1 g (95 mmol) of copper sulfate pentahydrate ($CuSO_4 \cdot 5H_2O$) and 24 ml (250 mmol) of trimethylaluminum, which were then reacted at 30° C. for 30 hours. Then, the solids were separated from the reaction mixture and the volatile matter was distilled away from the solution as obtained above under reduced pressure to produce 7.04 g of a contact product. The molecular weight thereof as determined by the freezing point depression method was 1,100.

(2) Preparation of styrenic polymer

In a 500 ml glass container equipped with a stirrer were placed 50 ml of toluene and the contact product as obtained in the preceding step (1) in an amount of 3 mmol in terms of aluminum atom. To the above mixture were further added 3 mmol of triisobutylaluminum, 0.06 mmol of pentamethylcyclopentadienyltrimethyltitanium, and 200 ml of styrene to proceed with polymerization reaction at 70° C. for 1 hour. After the completion of reaction, the reaction product was washed with methanol and dried to afford 36.1 g of polymer. The polymer thus obtained had a weight-average molecular weight of 400,000 and a number-average molecular weight of 200,000.

It was proved that the polymer was polystyrene having a syndiotacticity of 97% in terms of racemic pentad, aluminum content of 4,500 ppm and titanium content of 8 ppm from the results of melting point measurement and $^{13}$C-NMR analysis.

EXAMPLE 1

The powdery styrenic polymer obtained in the above production example was subjected to vacuum drying with stirring at 150° C. for 2 hours. The dried powder was melt extruded with a uniaxial extruding machine equipped with a vent and a die with a plurality of capillaries at the end thereof, cooled and cut off to produce raw material for extrusion molding in the form of pellet. The above melt extrusion was carried out at a melt temperature of 300° C., screw diameter of 50 mm with full flight type, extrusion rate of 30 kg/hr and vent pressure of 10 mmHg. Subsequently, the pellet was crystallized and dried in hot air with stirring. The dried pellet thus obtained had a residual styrene monomer content of 1,100 ppm and a crystallinity of 35%. Thereafter, the dried pellet was extruded at a extrusion temperature of 320° C., shear stress of $3 \times 10^5$ dyne/cm$^2$ by the use of an apparatus equipped with a T-die at the end of the uniaxial extruding machine to produce a melt extruded sheet.

The band-like molten resin thus obtained was directly laminated onto a superior paper having a unit weight of 300 g/m$^2$ to form a laminate with a resin thickness of 10 μm. Thereafter the laminate was heat treated at 250° C. for 10 sec. The results of evaluation of the laminate thus obtained for its heat resistance, hot-water resistance, tearability and dead foldability are given in Table 1.

EXAMPLE 2

The melt extruded sheet obtained in the same manner as in Example 1 was placed closely in contact with a metallic cooling roll adjusted to 70° C. by means of electrostatic charging at a cooling rate of 50° C./sec to produce an original sheet having a thickness of 110 μm and a crystallinity of 15%. The original sheet thus obtained was successively subjected to biaxial orientation in the order of machine direction and transverse direction at a draw ratio of 3 each at 110° C. and an orientation rate of 3000% per minute using a table tenter. Thereafter the oriented film thus obtained was heat treated at 260° C. for 30 sec. under limited contraction to afford a film having a thickness of 12 μm and a crystallinity of 55%. The biaxially oriented film thus obtained was coated with twin-pack curable polyurethane adhesive (produced by Toyo Moton Co., Ltd. under the tradename "Adcoat AD-900" and "RT-5") at a loading of 3.5 g/m² and then laminated onto a superior paper with a unit weight of 300 g/m². The properties of the laminate thus obtained are given in Table 1.

COMPARATIVE EXAMPLE 1

The procedure in Example 1 was repeated except that poly(4-methylpentene-1) treadnamed "TPX DX-810" was used in place of the above-mentioned styrenic polymer. The properties of the laminate thus obtained are given in Table 1.

COMPARATIVE EXAMPLE 2

The procedure in Example 2 was repeated except that a biaxially oriented polyethylene terephthalate film of 12 μm in thickness (produced by Toyobo Co., Ltd. under the tradename "Ester E 5100") was used in place of the aforesaid styrenic polymer. The properties of the laminate thus obtained are given in Table 1.

COMPARATIVE EXAMPLE 3

The procedure in Example 1 was repeated except that the heat treatment after laminating was omitted. The properties of the laminate thus obtained are given in Table 1.

COMPARATIVE EXAMPLE 4

The procedure in Example 2 was repeated except that a conventional cellophane film of 18 μm in thickness was used in place of the above-mentioned styrenic polymer. The properties of the laminate thus obtained are given in Table 1.

TABLE 1

| No. | Kind | Laminated resin Thickness (μm) | Crystallinity (%) |
|---|---|---|---|
| Example 1 | SPS | 10 | 45 |
| Example 2 | SPS | 12 | 43 |
| Comparative Example 1 | poly(4-methylpentene-1) | 10 | — |
| Comparative Example 2 | PET | 12 | — |
| Comparative Example 3 | SPS | 10 | 18 |
| Comparative Example 4 | cellophane | 18 | — |

| No. | Lamination method | Properties of Laminate heat resistance | hot-water resistance | tearability | dead foldability |
|---|---|---|---|---|---|
| Example 1 | extrusion lamination | o | o | o | o |
| Example 2 | dry lamination of biaxially oriented film and paper | o | o | o | o |
| Comparative Example 1 | extrusion lamination | x | o | Δ | Δ |
| Comparative Example 2 | dry lamination of biaxially oriented film and paper | x | x | Δ | Δ |
| Comparative Example 3 | extrusion lamination | Δ | Δ | o | o |
| Comparative Example 4 | dry lamination of cellophane film and paper | o | x | o | o |

In the table, SPS stands for syndiotactic polystyrene; PET designates polyethylene terephthalate; all the thicknesses are expressed in μm; crystallinity was determined by DSC method; and the properties of the laminates were evaluated in the following manner:

(1) Heat resistance was evaluated by observing the change after allowing to stand in an oven at 230° C. for 3 minutes.
   o: remain unchanged; Δ: partial distortion, fusion sticking; x: fusion sticking, surface roughening
(2) Hot-water resistance was evaluated by observing the change after allowing to stand in boiling water for 5 minutes.
   o: remain unchange; Δ: partial distortions, x: cause unevenness
(3) Tearability was evaluated by making a 1 cm long notch in the center line of the short side direction in a sheet (5×10 cm) and tearing by hand from the notch.
   o: tearable comparably to paper; Δ: greater resistance compared with paper
(4) Dead foldability was evaluated by folding into two and comparing the foldability with that of cellophane.
   o: comparable to cellophane; Δ: dead foldability being poor compared with cellophane

What is claimed is:

1. A laminate which comprises (a) a layer of (i) a styrenic polymer having at least 30% racemic pentad and a crystallinity of at least 25% or (ii) a composition consisting essentially of said styrenic polymer and at least one additive selected from the group consisting of inorganic fine particles, antioxidants, antistatic agents, flame retardants, and other resins than said styrenic polymer, said layer having a thickness of 5 to 50 μm and (b) a layer of natural paper.

2. The laminate according to claim 1, wherein said styrenic polymer has a crystallinity of at least 35%.

3. The laminate according to claim 1, wherein said layer (a) is an oriented film.

4. The laminate according to claim 1 which is formed by extrusion lamination.

5. The laminate according to claim 4, wherein said other resin is compatible with a styrenic polymer having syndiotactic configuration.

6. The laminate according to claim 5, wherein said other resin is selected from atactic styrenic polymer, isotactic styrenic polymer and polyphenylene ether.

7. The laminate according to claim 1, wherein said other resin is incompatible with a styrenic polymer having syndiotactic configuration.

8. The laminate according to claim 1, further comprising at least one layer selected from adhesive layer (c) and barrier layer (d).

9. The laminate according to claim 8, wherein said adhesive layer (c) comprises at least one member selected from adhesive and adhesive resin.

10. The laminate according to claim 8, wherein said barrier layer (d) comprises at least one member selected from aluminum foil, metallic vapor deposition film and inorganic-oxide vapor deposition film.

11. The laminate according to claim 8, comprising an adhesive layer (c) interposed between said layer (a) and layer (b).

12. The laminate according to claim 8, comprising a barrier layer (d) interposed between said layer (a) and layer (b).

13. The laminate according to claim 8, comprising a barrier layer (d), one side of which is affixed to said layer (b).

14. The laminate according to claim 8, comprising an adhesive layer (c) interposed between said layer (a), and layer (b), and a barrier layer (d), one side of which is affixed to said layer (b).

15. The laminate according to claim 8, comprising a layer (a), layer (c), layer (d), another layer (c) and layer (b) each being superposed in that order.

16. A laminate further improved in heat resistance and dimensional stability, characterized in that said laminate is produced by heat treating the laminate as claimed in claim 1 at 150° to 260° C. for 3 to 120 sec.

* * * * *